(12) United States Patent
Li et al.

(10) Patent No.: US 12,423,585 B2
(45) Date of Patent: Sep. 23, 2025

(54) METHOD FOR DYNAMIC EVOLUTION OF COMPOSITE SERVICE

(71) Applicant: ZHEJIANG UNIVERSITY, Zhejiang (CN)

(72) Inventors: Ying Li, Hangzhou (CN); Meng Xi, Hangzhou (CN); Jianwei Yin, Hangzhou (CN); Shuiguang Deng, Hangzhou (CN); Yihua Mao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 118 days.

(21) Appl. No.: 17/782,653

(22) PCT Filed: Jul. 20, 2021

(86) PCT No.: PCT/CN2021/107234
§ 371 (c)(1),
(2) Date: Jun. 5, 2022

(87) PCT Pub. No.: WO2022/246994
PCT Pub. Date: Dec. 1, 2022

(65) Prior Publication Data
US 2024/0185076 A1 Jun. 6, 2024

(30) Foreign Application Priority Data
May 24, 2021 (CN) .......................... 202110566208.X

(51) Int. Cl.
*G06N 3/086* (2023.01)
*G06N 3/045* (2023.01)
(52) U.S. Cl.
CPC .............. *G06N 3/086* (2013.01); *G06N 3/045* (2023.01)

(58) Field of Classification Search
CPC ........ G06N 3/086; G06N 3/045; G06N 3/084; G06N 3/047
See application file for complete search history.

(56) References Cited

U.S. PATENT DOCUMENTS

| 2010/0088701 A1 | 4/2010 | Greiner et al. |
| 2021/0382773 A1* | 12/2021 | Narendra .............. H04L 9/0825 |

FOREIGN PATENT DOCUMENTS

| CN | 102523252 | 6/2012 |
| CN | 103581309 | 2/2014 |

(Continued)

*Primary Examiner* — Angelica Ruiz
(74) *Attorney, Agent, or Firm* — Jiwen Chen; Joywin IP Law PLLC

(57) ABSTRACT

Disclosed in the present invention is a method for dynamic evolution of a composite service, which belongs to the field of service composition in software engineering, and comprises a composite service dynamic evolution process, a distributed service evolution mechanism and a multi-layer process evolution mechanism. The present invention can dynamically adjust the composite service according to a real-time state of an atomic service under a condition of dynamic change of the service quality of the atomic service, select different candidate services, and avoid falling into a local optimal solution. At the same time, the present invention can dynamically optimize a service process according to the selection of the atomic service under the condition of loose coupling and low constraints, while taking into account the evolution of a single service and the co-evolution of services. Further, in order to reduce the load of the atomic service, the present invention utilizes service performance data generated when the service is actually running, so as to avoid empty requests due to obtaining the service quality information of the atomic service.

9 Claims, 2 Drawing Sheets

(56) References Cited

FOREIGN PATENT DOCUMENTS

| CN | 111125541 | | 5/2020 |
|----|-----------|---|--------|
| CN | 112733999 | | 4/2021 |
| CN | 112822043 | | 5/2021 |
| TW | I676148 B | * | 11/2019 |

* cited by examiner

METHOD FOR DYNAMIC EVOLUTION OF COMPOSITE SERVICE

This is a U.S. national stage application of PCT Application No. PCT/CN2021/107234 under 35 U.S.C. 371, filed Jul. 20, 2021 in Chinese, claiming priority to Chinese Patent Applications No. 202110566208.X, filed May 24, 2021, all of which are hereby incorporated by reference.

FIELD OF TECHNOLOGY

The present invention belongs to the field of service composition in software engineering, in particular to a dynamic evolution method of a composite service.

BACKGROUND TECHNOLOGY

Service composition is a compelling way to rapidly build large-scale distributed applications in a public cloud. With the rapid increase in composite service requests from many customers in the public cloud, cloud computing service composition is critical to effectively perform quality-of-service-aware.

In recent years, many researchers have focused on automatic service composition because it is a significant and promising solution for software engineering. Its basic idea depends on a triangular model of a service-oriented architecture, and is mostly realized through network service related technologies, combining reusable off-the-shelf services into value-added composite services to satisfy requesters. Compared to manual composition and traditional "programming from scratch" development, automatic composition has many benefits and advantages, such as low cost, time savings, reduced risk, and flexibility. All of these drive the adoption of the automatic composition to meet software requirements.

In traditional composition, an implicit assumption is that services run on heavyweight enterprise servers, which often provide compute-intensive functionality. This is the traditional context for the service composition. However, this assumption and background may be shattered by rapid development of network technologies and powerful cloud computing capabilities. When cloud services become basic units of the composite services, service integration is no longer be limited to the traditional context, and it should be more flexible and complex.

For example, Chinese patent document with a publication number CN111125541A discloses an acquisition method of multi-user oriented sustainable multi-cloud service composition, which comprises the following steps: constructing a multi-user-service scoring matrix based on social network information; further optimizing the multi-user-service scoring matrix by Support Vector Machines (SVM) regression, and then performing Density-Based Spatial Clustering of Applications with Noise (DBSCAN) clustering to the services so as to obtain a service request sequence; inputting the service request sequence into concept grids, and performing a screening operation so as to obtain a composition of candidate cloud services, and then calculating a sustainable index for each candidate cloud service composition and using the index to obtain a multi-cloud service composition that meets the sustainability best. This method improves a cold-start problem of sparse data in traditional collaborative filtering, strengthens service aggregation, and improves the accuracy of service acquisition.

Atomic services that constitute the composite service are usually network services provided by a third-party, which brings new challenges to the service composition. First, service quality of the atomic services changes dynamically, which makes the composite service need to be dynamically adjusted according to the real-time status of the atomic services, and select different candidate services to avoid falling into a local optimal solution. Second, third-party atomic services on different platforms introduce additional service collaboration time, which requires the composite service to dynamically optimize a service process according to the selection of the atomic services under the condition of loose coupling and low constraints, while taking into account the evolution of a single service and the co-evolution of the services. Third, because the third-party atomic service is called by a large number of composite services, in order to reduce the load of the atomic services, it is necessary to avoid empty requests for obtaining the service quality information of the atomic services as much as possible.

SUMMARY OF THE INVENTION

The present invention provides a method for dynamic evolution of a composite service, which can dynamically adjust according to a real-time state of an atomic service, and dynamically optimize a service process according to the selection of the atomic service.

A method for dynamic evolution of a composite service, comprising the following steps:
(1) when a new service request occurs, firstly importing an initial composite service CS, and initializing an evolution threshold TH1 and an evolution success threshold TH2 at the same time;
(2) taking the composite service CS as an input, calculating an evolution probability EP through a neural network NN1;
(3) comparing the evolution probability EP with the evolution threshold TH1, and if EP>TH1, then performing step (4), otherwise, performing step (11);
(4) performing distributed service evolution;
(5) selectively performing multi-layer process evolution;
(6) responding to the request through an evolved composite service CS;
(7) recording the performance CS'.PF of the evolved composite service CS', and adding a record into a set SPF for the performance of the composite service;
(8) taking the composite service CS and the evolved composite service CS' as inputs, calculating an evolution success probability SP through a neural network NN2;
(9) back-propagating, and updating parameters of the neural networks NN2, NN1;
(10) comparing the evolution success probability SP with the evolution success threshold TH2, and if SP>TH2, then performing step (14), otherwise, performing step (13);
(11) responding to the request through the composite service CS;
(12) recording the performance CS.PF of the composite service CS, and adding a record into the set SPF for the performance of the composite service;
(13) retaining the composite service CS as an initial service for a next run, and ending;
(14) making the evolved composite service CS' as an initial service for a next run, and ending.

The specific process of step (4) is as follows:
(4-1) performing steps (4-2) to (4-4) simultaneously for each activity in the composite service CS;

(4-2) if an atomic service originally used by the activity is already fully loaded or is incapable of responding to a new request, removing the atomic service from a candidate service set and executing step (4-4); otherwise, executing step (4-3) directly;

(4-3) taking a random number RN, and if RN<EP, then executing step (4-4), otherwise, ending;

(4-4) selecting one of active candidate services as a new atomic service for subsequent execution by means of random weighting, wherein a calculation formula for a probability of the candidate service S being selected is as follows:

$$P(S) = \frac{\text{count}(S) + \text{avg}(*)}{2 \times \text{count}(*)}$$

wherein, P(S) represents the probability that the candidate service S is selected, count(S) represents the number of times that the candidate service S is called, avg(*) represents an average number of times that all candidate services are called, and count(*) represents the total number of times that all the candidate services are called.

In step (5), the selectively performing multi-layer process evolution means that: when activities in a composite service process have a constraint of an execution order, then not performing multi-layer process evolution, otherwise, performing multi-layer process evolution.

The specific process of step (5) is as follows:

(5-1) taking a start event of the composite service CS or a node without a previous predecessor node as a current node CNode;

(5-2) taking the random number RN, if RN<EP, then performing step (5-3), otherwise, performing (5-4);

(5-3) randomly swapping positions of the current node CNode and an activity subsequent thereto and before a next gateway node or event node;

(5-4) if the current node CNode does not have a controllable sub-process SubCS, performing (5-4) directly, otherwise, starting a new evolution process for the controllable sub-process SubCS, independently performing the multi-layer process evolution on the SubCS, and continuing to perform (5-5) at the same time;

(5-5) taking a subsequent adjacent node of the current node CNode in the process as a new CNode, if the new CNode is a process end event or there is no subsequent node, then ending; if the new CNode is an activity having a subsequent node, then performing step (5-2); if the new CNode is an event node or a gateway node, repeating step (5-5).

In step (9), when updating parameters of the neural networks NN2, NN1, an optimization objective is:

$$\min V(NN1, NN2) = \left(NN1(CS) - \left(1 - \sum CS \cdot PF / \sum SPF \cdot PF\right)\right)^2 + \left(NN2(CS, CS') - e^{avg(CS' \cdot PF) - avg(CS \cdot PF)} / e^{avg(CS' \cdot PF) + avg(CS \cdot PF)}\right)^2$$

wherein, NN1(CS) is the evolution probability calculated by the neural network NN1 for the composite service CS; NN2(CS, CS') is the evolution success probability calculated by the neural network NN2 for the composite services CS and CS'; ΣCS.PF is a sum of all recorded service performances of the composite service CS; ΣSPF.PF is a sum of all service performances in the service performance set SPF, avg(CS.PF) is an average value of all recorded service performances of the composite service CS, avg(CS'.PF) is an average value of all recorded service performances for the composite service CS'.

In step (7) and step (12), the set SPF for the performance of the composite services is a set of two-tuples composed of (CSkey, PFlist), wherein CSkey represents a unique key value of the composite service, which is generated by an existing hash algorithm for the composite service; PFlist represents an ordered repeatable list composed of all historical running performances of the composite service corresponding to CSkey.

The performances of the composite services are a single service performance value mapped from existing quality of service values that can be collected by using any of existing computing methods, and the larger the value needed to meet the service performance, the better the service is.

In step (2), an input of the neural network NN1 is a certain composite service CS, and an output of the neural network NN1 is the evolution probability EP of the composite service; and an internal structure thereof can be replaced by an existing multi-layer fully connected neural network, a cyclic neural network, a convolutional neural network, a deep neural network and other common neural network algorithms.

In step (8), the inputs of the neural network NN2 are two certain composite services CS and CS', and the output is the evolution success probability SP of the composite service CS' relative to the composite service CS; and an internal structure thereof can be replaced by an existing multi-layer fully connected neural network, a cyclic neural network, a convolutional neural network, a deep neural network and other common neural network algorithms.

Compared with the prior art, the present disclosure has the following beneficial effects:

1. The present invention can dynamically adjust the composite service according to a real-time state of an atomic service under a condition of dynamic change of the service quality of the atomic service, select different candidate services, and avoid falling into a local optimal solution.

2. The present invention can dynamically optimize a service process according to the selection of the atomic service under the condition of loose coupling and low constraints, while taking into account the evolution of a single service and the co-evolution of services.

3. In order to reduce the load of the atomic service, the present invention utilizes service performance data generated when the service is actually running, so as to avoid empty requests for obtaining the service quality information of the atomic service.

DESCRIPTION OF THE EMBODIMENTS

The present invention is further described in detail below with reference to the accompanying drawings and embodiments. It should be pointed out that the following embodiments are intended to facilitate the understanding of the present invention, but do not have any limiting effect on it. The operation method without specifying specific conditions in the following embodiments is usually in accordance with conventional conditions, or in accordance with conditions suggested by the manufacturer.

Figure 1:
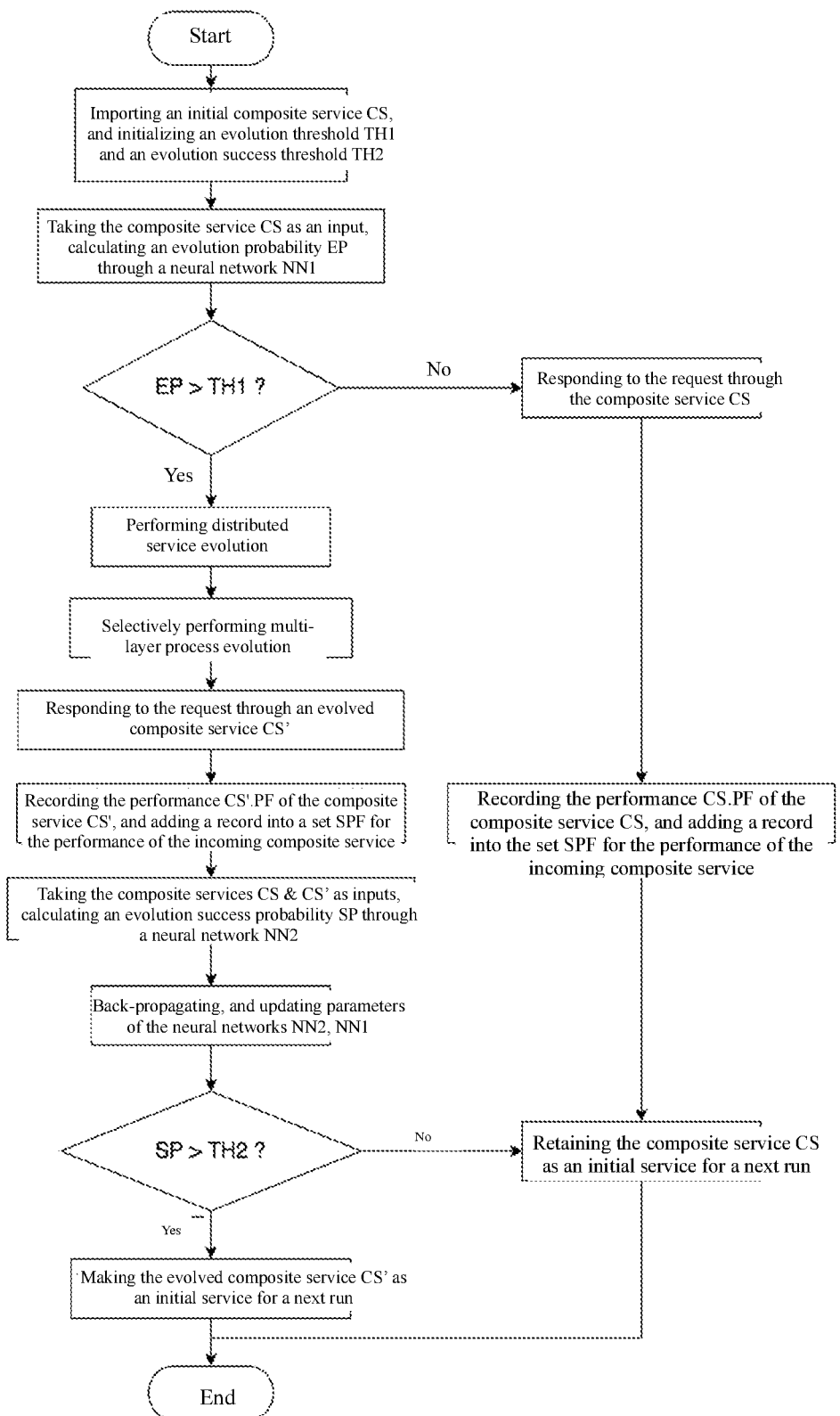
FIG. 1 is a schematic flowchart of a method for dynamic evolution of a composite service according to the present invention.
Figure 2:
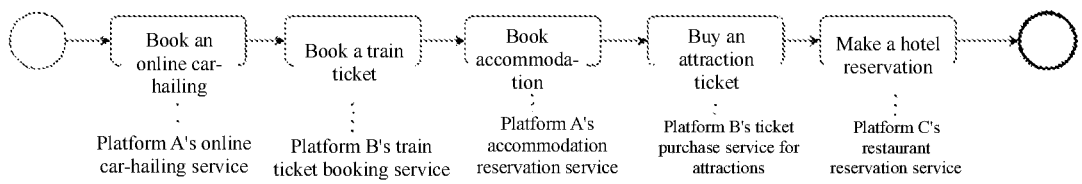
FIG. 2 is a schematic diagram of an initialized service composition imported in an embodiment of the present invention.

This embodiment takes a composite service of a travel assistant as an example. As shown in FIG. 1, a method for dynamic evolution of the composite service comprises the following steps:

When a new service request appears, first importing an initialized composite service ABABC, and a process thereof is shown in FIG. 2.

At the same time, initializing an evolution threshold TH1 and an evolution success threshold TH2, both of which are initialized to 0.5 here.

Next, inputting feature parameters of the process into a fully connected neural network NN1, and obtaining an evolution probability EP thereof as 0.7.

Figure 3:
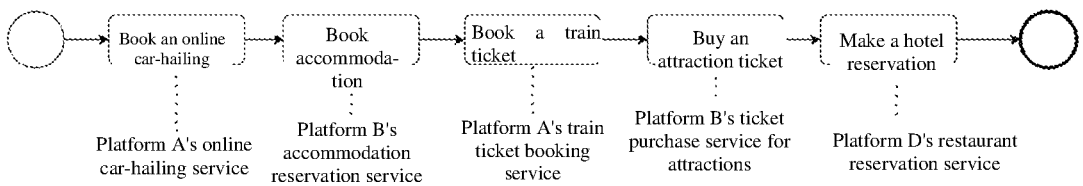
FIG. 3 is a schematic diagram of a composite service after performing distributed service evolution in an embodiment of the present invention.

Since the evolution probability EP is greater than the evolution threshold TH1, beginning distributed service evolution, wherein the evolution result is composite service ABABD, as shown in FIG. 3.

Figure 4:
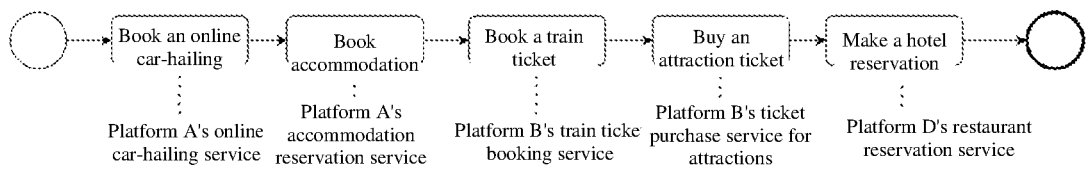
FIG. 4 is a schematic diagram of a composite service after multi-layer process evolution is performed on a process in an embodiment of the present invention.

Then continuing to perform multi-layer process evolution on the process, wherein the evolution result is composite service AABBD, as shown in FIG. 4.

Responding to the request through an evolved composite service, and recording the performance after execution (the calculated value is 11), and adding a record into a performance set of the near composite service.

SPF={(ABABC,[7]),(AABBD,[11])} taking composite services ABABC and AABBD as inputs, calculating an evolution success probability SP through a neural network NN2 as 0.6.

Back-propagating, and updating parameters of the neural networks NN2, NN1.

Since the evolution success probability SP is greater than the evolution success threshold TH2, the evolved composite service AABBD is an initial service for running next time.

The above-mentioned embodiments describe the technical solutions and beneficial effects of the present invention in detail. It should be understood that the above-mentioned embodiments are only specific embodiments of the present invention, and are not intended to limit the present invention. Any modifications, additions and equivalent replacements made within the scope of the principles of the present invention shall be included within the protection scope of the present invention.

What is claimed is:

1. A method for dynamic evolution of a composite service, comprising the following steps:
   (1) when a new service request occurs, firstly importing an initial composite service CS, and initializing an evolution threshold TH1 and an evolution success threshold TH2 at the same time;
   (2) taking the composite service CS as an input, calculating an evolution probability EP through a neural network NN1;
   (3) comparing the evolution probability EP with the evolution threshold TH1, and if EP>TH1, then performing step (4), otherwise, performing step (11);
   (4) performing distributed service evolution;
   (5) selectively performing multi-layer process evolution;
   (6) responding to the request through an evolved composite service CS';
   (7) recording the performance CS'.PF of the evolved composite service CS', and adding a record into a set SPF for the performance of the composite service;
   (8) taking the composite service CS and the evolved composite service CS' as inputs, calculating an evolution success probability SP through a neural network NN2;
   (9) back-propagating, and updating parameters of the neural networks NN2, NN1;
   (10) comparing the evolution success probability SP with the evolution success threshold TH2, and if SP>TH2, then performing step (14), otherwise, performing step (13);
   (11) responding to the request through the composite service CS;
   (12) recording the performance CS.PF of the composite service CS, and adding a record into the set SPF for the performance of the composite service;
   (13) retaining the composite service CS as an initial service for a next run, and ending;
   (14) making the evolved composite service CS' as an initial service for a next run, and ending.

2. The method for dynamic evolution of a composite service according to claim 1, wherein the specific process of step (4) is as follows:
   (4-1) performing steps (4-2) to (4-4) simultaneously for each activity in the composite service CS;
   (4-2) if an atomic service originally used by the activity is already fully loaded or is incapable of responding to a new request, removing the atomic service from a candidate service set and executing step (4-4); otherwise, executing step (4-3) directly;
   (4-3) taking a random number RN, and if RN<EP, then executing step (4-4), otherwise, ending;
   (4-4) selecting one of active candidate services as a new atomic service for subsequent execution by means of random weighting, wherein a calculation formula for a probability of the candidate service S being selected is as follows:

$$P(S) = \frac{\text{count}(S) + \text{avg}(*)}{2 \times \text{count}(*)};$$

wherein, P(S) represents the probability that the candidate service S is selected, count(S) represents the number of times that the candidate service S is called, avg(*) represents an average number of times that all candidate services are called, and count(*) represents the total number of times that all the candidate services are called.

3. The method for dynamic evolution of a composite service according to claim 1, wherein in step (5), the selectively performing multi-layer process evolution means that: when activities in a composite service process have a constraint of an execution order, then not performing multi-layer process evolution, otherwise, performing multi-layer process evolution.

4. The method for dynamic evolution of a composite service according to claim 3, wherein the specific process of step (5) is as follows:
  (5-1) taking a start event of the composite service CS or a node without a previous predecessor node as a current node CNode;
  (5-2) taking the random number RN, if RN<EP, then performing step (5-3), otherwise, performing (5-4);
  (5-3) randomly swapping positions of the current node CNode and an activity subsequent thereto and before a next gateway node or event node;
  (5-4) if the current node CNode does not have a controllable sub-process SubCS, performing (5-4) directly, otherwise, starting a new evolution process for the controllable sub-process SubCS, independently performing the multi-layer process evolution on the SubCS, and continuing to perform (5-5) at the same time;
  (5-5) taking a subsequent adjacent node of the current node CNode in the process as a new CNode, if the new CNode is a process end event or there is no subsequent node, then ending; if the new CNode is an activity having a subsequent node, then performing step (5-2); if the new CNode is an event node or a gateway node, repeating step (5-5).

5. The method for dynamic evolution of a composite service according to claim 1, wherein, in step (9), when updating the parameters of the neural networks NN2, NN1, an optimization objective is as follows:

$$\min V(NN1, NN2) = (NN1(CS) - (1 - \sum CS \cdot PF / \sum SPF \cdot PF))^2 + (NN2(CS, CS') - e^{avg(CS' \cdot PF) - avg(CS \cdot PF)}/e^{avg(CS' \cdot PF) + avg(CS \cdot PF)})^2$$

wherein, the NN1(CS) is the evolution probability calculated by the neural network NN1 for the composite service CS; the NN2(CS, CS') is the evolution success probability calculated by the neural network NN2 for the composite services CS and CS; the ΣCS.PF is a sum of all recorded service performances of the composite service CS; the ΣSPF.PF is a sum of all service performances in the service performance set SPF, the avg (CS.PF) is an average value of all recorded service performances of the composite service CS, the avg (CS'.PF) is an average value of all recorded service performances for the composite service CS'.

6. The method for dynamic evolution of a composite service according to claim 1, wherein, in step (7) and step (12), the set SPF for the performance of the composite service is a set of two-tuples composed of (CSkey, PFlist), wherein the CSkey represents a unique key value of the composite service, which is generated by an existing hash algorithm for the composite service; the PFlist represents an ordered repeatable list composed of all historical running performance of the composite service corresponding to the CSkey.

7. The method for dynamic evolution of a composite service according to claim 1, wherein, in steps (7) and (12), the performance of the composite service is a single service performance value mapped, by using any of existing computing methods, from existing quality of service values that can be collected, and the larger the value needed to meet the service performance, the better the service is.

8. The method for dynamic evolution of a composite service according to claim 1, wherein, an input of the neural network NN1 is a certain composite service CS, and an output of the neural network NN1 is the evolution probability EP of the composite service; and the neural network NN1 adopts one of a multi-layer fully connected neural network, a cyclic neural network, a convolutional neural network and a deep neural network.

9. The method for dynamic evolution of a composite service according to claim 1, wherein, an input of the neural network NN2 is two certain composite services CS and CS', and an output of the neural network NN2 is the evolution success probability SP of the composite service CS' relative to the composite service CS; and the neural network NN2 adopts one of a multi-layer fully connected neural network, a cyclic neural network, a convolutional neural network and a deep neural network.

* * * * *